(12) United States Patent
Noh et al.

(10) Patent No.: US 12,100,802 B2
(45) Date of Patent: Sep. 24, 2024

(54) ALL SOLID STATE BATTERY AND METHOD OF MANUFACTURING THE SAME

(71) Applicant: SAMSUNG ELECTRO-MECHANICS CO., LTD., Suwon-si (KR)

(72) Inventors: Jung Eun Noh, Suwon-si (KR); Soo Young Ji, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 112 days.

(21) Appl. No.: 17/470,248

(22) Filed: Sep. 9, 2021

(65) Prior Publication Data

US 2022/0209285 A1    Jun. 30, 2022

(30) Foreign Application Priority Data

Dec. 31, 2020   (KR) ................. 10-2020-0189695

(51) Int. Cl.
*H01M 10/0562*   (2010.01)
*H01M 4/02*   (2006.01)
(Continued)

(52) U.S. Cl.
CPC ....... *H01M 10/0562* (2013.01); *H01M 4/525* (2013.01); *H01M 4/661* (2013.01);
(Continued)

(58) Field of Classification Search
CPC ........ H01M 4/525; H01M 4/661; H01M 4/80; H01M 10/0862; H01M 10/0525;
(Continued)

(56) References Cited

U.S. PATENT DOCUMENTS

2017/0278634 A1   9/2017   Kato
2019/0296346 A1*  9/2019   Harada .................. H01M 4/485
(Continued)

FOREIGN PATENT DOCUMENTS

CN   111180738 A  *  5/2020   .......... H01M 10/052
JP   2015-060720 A     3/2015
(Continued)

*Primary Examiner* — Christopher P Domone
*Assistant Examiner* — Jonathan William Estes
(74) *Attorney, Agent, or Firm* — Morgan, Lewis & Bockius LLP

(57) ABSTRACT

An all solid state battery includes: a battery body including an electrode assembly having first and second surfaces in a first direction, third and fourth surfaces in a second direction, and fifth and sixth surfaces in a third direction, and including a solid electrolyte layer and a cathode and an anode; a first connection portion; and a second connection portion disposed on the electrode assembly. The first connection portion includes a first current collecting electrode and a first protection portion, the second connection portion includes a second current collecting electrode and a second protection portion, and the first current collecting electrode is drawn out to one surface of the first connection portion in the third direction and the second current collecting electrode is drawn out to one surface of the second connection portion in the third direction.

21 Claims, 14 Drawing Sheets

(51) Int. Cl.
  *H01M 4/525*     (2010.01)
  *H01M 4/66*      (2006.01)
  *H01M 4/80*      (2006.01)
  *H01M 10/0525*   (2010.01)
  *H01M 50/54*     (2021.01)
  *H01M 50/562*    (2021.01)

(52) U.S. Cl.
  CPC ......... *H01M 4/80* (2013.01); *H01M 10/0525* (2013.01); *H01M 50/54* (2021.01); *H01M 50/562* (2021.01); *H01M 2004/021* (2013.01); *H01M 2004/027* (2013.01); *H01M 2004/028* (2013.01)

(58) Field of Classification Search
  CPC ..... H01M 2004/021; H01M 2004/027; H01M 2004/028
  See application file for complete search history.

(56) References Cited

U.S. PATENT DOCUMENTS

| | | | |
|---|---|---|---|
| 2020/0020974 A1 | 1/2020 | Shimizu et al. | |
| 2020/0303780 A1* | 9/2020 | Baba | H01M 10/0562 |
| 2021/0242446 A1* | 8/2021 | Jin | H01M 10/0585 |
| 2021/0384549 A1* | 12/2021 | Yano | H01M 4/525 |
| 2022/0102698 A1* | 3/2022 | Li | H01M 4/70 |

FOREIGN PATENT DOCUMENTS

| | | | | |
|---|---|---|---|---|
| JP | 2017-175037 A | | 9/2017 | |
| KR | 20200129728 A | * | 11/2020 | |
| WO | WO-2018186449 A1 | * | 10/2018 | |
| WO | 2018/203474 A1 | | 11/2018 | |
| WO | WO-2020111166 A1 | * | 6/2020 | ........ H01M 10/0525 |

* cited by examiner

ALL SOLID STATE BATTERY AND METHOD OF MANUFACTURING THE SAME

CROSS-REFERENCE TO RELATED APPLICATION(S)

This application claims benefit of priority to Korean Patent Application No. 10-2020-0189695 filed on Dec. 31, 2020 in the Korean Intellectual Property Office, the disclosure of which is incorporated herein by reference in its entirety.

TECHNICAL FIELD

The present disclosure relates to an all solid state battery.

BACKGROUND

Recently, devices using electricity as an energy source are increasing. As the fields to which the use of electricity is applied expand to smartphones, camcorders, notebook personal computers (PCs), electric vehicles, and the like, there is increasing interest in electric storage devices using electrochemical devices. Among various electrochemical devices, lithium secondary batteries that can be charged and discharged, each having a high operating voltage and a remarkably large energy density, are in the spotlight.

A lithium secondary battery is manufactured by applying a material capable of intercalating and deintercalating lithium ions to a cathode and an anode and injecting a liquid electrolyte between the cathode and the anode, and electricity is generated or consumed by a oxidation-reduction reaction according to intercalation or deintercalation of lithium ions between the anode and the cathode. Such a lithium secondary battery basically needs to be stable in the operating voltage range of the battery and to have the ability to transfer ions at a sufficiently high speed.

When a liquid electrolyte such as a non-aqueous electrolyte solution is used for such a lithium secondary battery, there is an advantage in that a discharge capacity and an energy density are high. However, it is difficult for the lithium secondary battery to implement a high voltage, and the lithium secondary battery has a problem in that there is a high risk of electrolyte leakage, fire, or explosion.

In order to solve the above-described problem, a secondary battery using a solid electrolyte instead of the liquid electrolyte has been proposed as an alternative. The solid electrolyte can be classified into a polymer-based solid electrolyte and a ceramic-based solid electrolyte. The ceramic-based solid electrolyte has an advantage of a high stability. However, the ceramic-based solid electrolyte has a problem in that ionic conductivity or charging/discharging efficiency deteriorates due to poor contact at an interface between the electrolyte and the electrode, side reactions at the interface, and the like.

SUMMARY

An aspect of the present disclosure may provide an all solid state battery having a high reliability in terms of moisture resistance.

Another aspect of the present disclosure may provide an all solid state battery having a simplified production process.

Another aspect of the present disclosure may provide an all solid state battery capable of producing a small-sized product.

According to an aspect of the present disclosure, an all solid state battery may include: a battery body including an electrode assembly having first and second surfaces opposing each other in a first direction, third and fourth surfaces opposing each other in a second direction, and fifth and sixth surfaces opposing each other in a third direction, and including a solid electrolyte layer and a cathode and an anode stacked in the third direction with the solid electrolyte layer interposed therebetween, a first margin portion disposed on the third surface of the electrode assembly, and a second margin portion disposed on the fourth surface of the electrode assembly; a first connection portion disposed on the first surface of the electrode assembly; and a second connection portion disposed on the second surface of the electrode assembly. The first connection portion may include a first current collecting electrode connected to the cathode and a first protection portion disposed on the first current collecting electrode, the second connection portion may include a second current collecting electrode connected to the anode and a second protection portion disposed on the second current collecting electrode, and the first current collecting electrode may be drawn out to one surface of the first connection portion in the third direction and the second current collecting electrode may be drawn out to one surface of the second connection portion in the third direction.

According to another aspect of the present disclosure, an all solid state battery may include: a battery body including an electrode assembly having first and second surfaces opposing each other in a first direction, third and fourth surfaces opposing each other in a second direction, and fifth and sixth surfaces opposing each other in a third direction, and including a solid electrolyte layer and a cathode and an anode stacked in the second direction with the solid electrolyte layer interposed therebetween, a first margin portion disposed on the third surface of the electrode assembly, and a second margin portion disposed on the fourth surface of the electrode assembly; a first connection portion disposed on the first surface of the electrode assembly; and a second connection portion disposed on the second surface of the electrode assembly. The first connection portion may include a first current collecting electrode connected to the cathode and a first protection portion disposed on the first current collecting electrode, the second connection portion may include a second current collecting electrode connected to the anode and a second protection portion disposed on the second current collecting electrode, and the first current collecting electrode may be drawn out to one surface of the first connection portion in the third direction and the second current collecting electrode may be drawn out to one surface of the second connection portion in the third direction.

According to another aspect of the present disclosure, an all solid state battery may include: a battery body including an electrode assembly including a solid electrolyte layer and a cathode and an anode stacked with the solid electrolyte layer interposed therebetween; a first connection portion including a first current collecting electrode connected to the cathode and a first ceramic layer covering the first current collecting electrode; and a second connection portion including a second current collecting electrode connected to the anode and a second ceramic layer covering the second current collecting electrode. The first current collecting electrode may include an end exposed from the first ceramic layer, and the second current collecting electrode may include an end exposed from the second ceramic layer.

According to another aspect of the present disclosure, an all solid state battery may include: a battery body including an electrode assembly including a solid electrolyte layer and a cathode and an anode stacked with the solid electrolyte layer interposed therebetween, the cathode exposed from a first surface of the electrode assembly and the anode exposed from a second surface of the electrode assembly opposing the first surface; a first connection portion including a first current collecting electrode disposed on the first surface and connected to the cathode, and a first insulating layer covering the first current collecting electrode; and a second connection portion including a second current collecting electrode disposed on the second surface and connected to the anode, and a second insulating layer covering the second current collecting electrode. The first current collecting electrode may include an end exposed from the first insulating layer, and the second current collecting electrode may include an end exposed from the second insulating layer.

According to another aspect of the present disclosure, a method of manufacturing an all solid state battery may include: forming a battery body including an electrode assembly having a cathode and an anode stacked with a solid electrolyte layer interposed therebetween; forming a first conductive paste layer on one surface of the battery body, and a first ceramic paste layer covering the first conductive paste layer and being in contact with the battery body; forming a second conductive paste layer on another surface of the battery body, and a second ceramic paste layer covering the second conductive paste layer and being in contact with the battery body; and simultaneously sintering the battery body, the first conductive paste layer, the first ceramic paste layer, the second conductive paste layer, and the second ceramic paste layer. A first current collecting electrode, formed of the first conductive paste layer by the sintering, is connected to the sintered cathode, a second current collecting electrode, formed of the second conductive paste layer by the sintering, is connected to the sintered anode, and the first current collecting electrode includes an end exposed from a first ceramic layer, formed of the first ceramic paste layer by the sintering, and the second current collecting electrode includes an end exposed from a second ceramic layer, formed of the second ceramic paste layer by the sintering.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Figure 1:
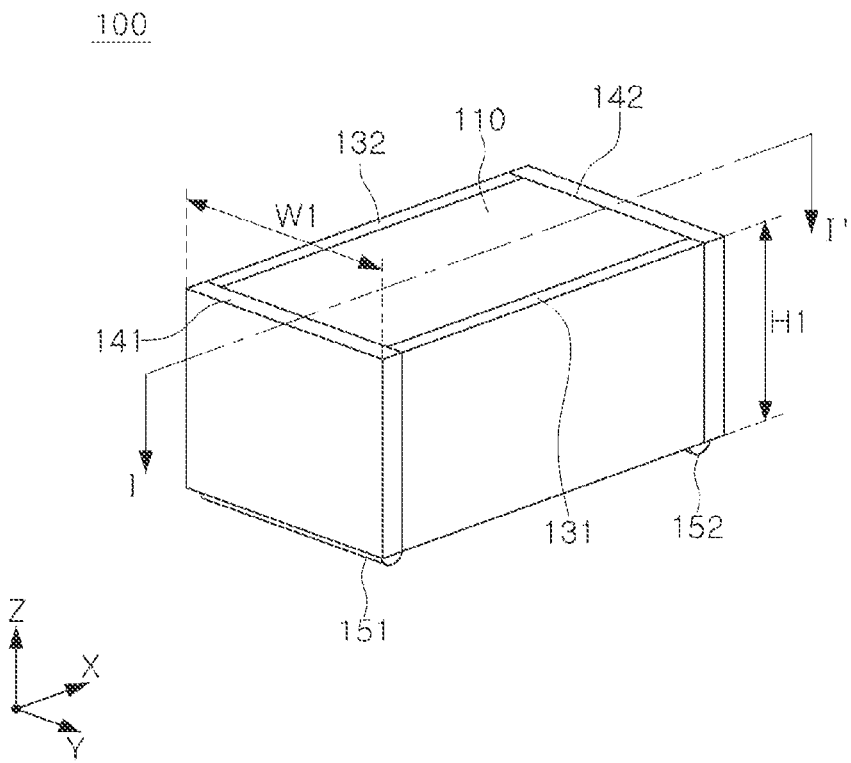
FIG. 1 is a perspective view schematically illustrating an all solid state battery according to an exemplary embodiment of the present disclosure.

Hereinafter, exemplary embodiments of the present disclosure will now be described in detail with reference to the accompanying drawings.

In the drawings, an X direction may be defined as a first direction, an L direction or a length direction, a Y direction may be defined as a second direction, a W direction or a width direction, and a Z direction may be defined as a third direction, a T direction, or a thickness direction.

The present disclosure relates to an all solid state battery 100. FIGS. 1 through 7 are views schematically illustrating an all solid state battery 100 according to an exemplary embodiment of the present disclosure. Referring to FIGS. 1 through 7, the all solid state battery 100 according to the present disclosure may include: a battery body 110 including an electrode assembly 120 having first and second surfaces S1 and S2 opposing each other in the first direction (X direction), third and fourth surfaces S3 and S4 opposing each other in the second direction (Y direction), and fifth and sixth surfaces S5 and S6 opposing each other in the third direction (Z direction), and including a solid electrolyte layer 111 and a cathode 121 and an anode 122 stacked in the third direction (Z direction) with the solid electrolyte layer 111 interposed therebetween, a first margin portion 131 disposed on the third surface S3 of the electrode assembly 120, and a second margin portion 132 disposed on the fourth surface S4 of the electrode assembly 120; a first connection portion 141 disposed on the first surface S1 of the electrode assembly 120; and a second connection portion 142 disposed on the second surface S2 of the electrode assembly 120.

In this case, the first connection portion 141 may include a first current collecting electrode 141a connected to the cathode 121 and a first protection portion 141b disposed on the first current collecting electrode 141a, and the second connection portion 142 may include a second current collecting electrode 142a connected to the anode 122 and a second protection portion 142b disposed on the second current collecting electrode 142a. In addition, the first current collecting electrode 141a and the second current collecting electrode 142a may be drawn out to any one surface of the first connection portion 141 in the third direction (Z direction) and to any one surface of the second connection portion 142 in the third direction (Z direction), respectively. The first current collecting electrode 141a and the second current collecting electrode 142a may be drawn out to a surface in a direction toward the fifth surface S5 or the sixth surface S6 of the electrode assembly 120.

That is, the current collecting electrodes of the all solid state battery 100 according to the present exemplary embodiment may be drawn out only to any one of the six outer surfaces in the third direction (Z direction). In addition, when the all solid state battery 100 according to the present exemplary embodiment is viewed, each of the current collecting electrodes may not be seen as being drawn out to five surfaces thereof, and the electrode drawn out to the outside may be seen only through one surface thereof in the third direction (Z direction).

Figure 2:
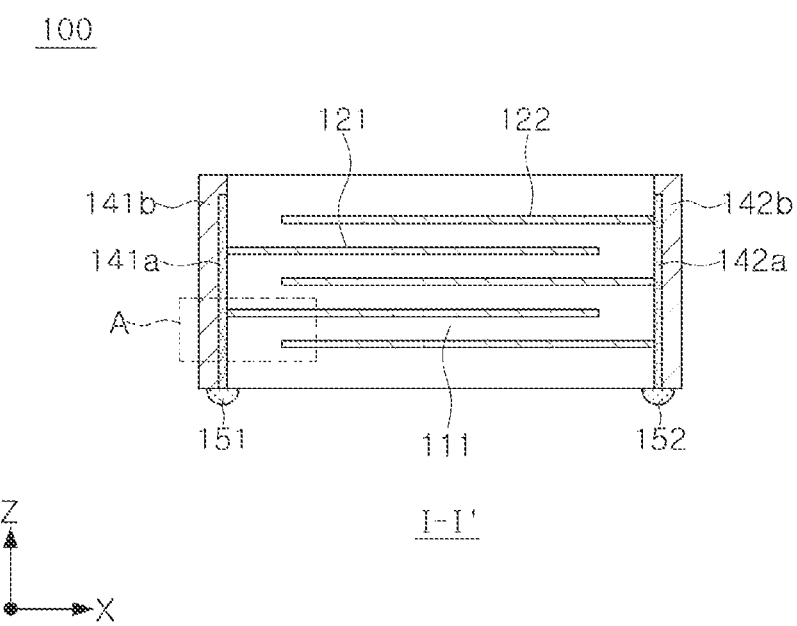
FIG. 2 is a cross-sectional view taken along line I-I' of FIG. 1.

Referring to FIG. 2, the first current collecting electrode 141a and the second current collecting electrode 142a may be drawn out through one surface (the sixth surface S6) of the electrode assembly 120 in the third direction (Z direction), and the first current collecting electrode 141a and the second current collecting electrode 142a may be disposed to be spaced apart from each other with the battery body 110 interposed therebetween. In conventional sintered all solid state batteries, an external electrode connected to a cathode and an anode has been disposed to cover a head surface of a battery body. In this case, there has been a problem that a gap between the battery body and the external electrode is generated, moisture penetrates between the battery body and the external electrode, or the like. In the above-described exemplary embodiment of the present disclosure, the electrode is minimally exposed to the outside to effectively prevent penetration of moisture from the outside, thereby implementing a high reliability in moisture resistance.

In addition, in the conventional art, there has been a problem that internal stress may remain due to a difference in shrinkage behavior between the external electrode and the battery body, resulting in a deterioration in mechanical strength of the battery itself. The all solid state battery according to the present disclosure may have an improved mechanical strength by itself by simultaneously firing the battery body and the electrodes through a single sintering process, as will be described later, without forming a separate external electrode. Furthermore, since no separate external electrode is disposed, the component itself can be small-sized.

In the all solid state battery 100 according to the present disclosure, the first connection portion 141 may include a first current collecting electrode 141a and a first protection portion 141b. Also, the second connection portion 142 may include a second current collecting electrode 142a and a second protection portion 142b.

In an exemplary embodiment of the present disclosure, in the all solid state battery 100, the first protection portion 141b may be disposed to at least partially cover the first current collecting electrode 141a, and the second protection portion 142b may be disposed to at least partially cover the second current collecting electrode 142a. The disposing of the protection portion to at least partially cover the current collecting electrode may mean that the protection portion is disposed at least partially on each of the opposite surfaces of the first current collecting electrode 141a and the second current collecting electrode 142a, which are disposed on the electrode assembly 120 of the all solid state battery 100 according to the present disclosure, in the first direction (X direction), and the protection portion is disposed at least partially in contact with each of the first current collecting electrode 141a and the second current collecting electrode 142a.

In another exemplary embodiment, in the all solid state battery 100, the first protection portion 141b may be disposed to entirely cover one surface of the first current collecting electrode 141a in the first direction (X direction), and the second protection portion 142b may be disposed to entirely cover one surface of the second current collecting electrode 142a in the first direction (X direction). The disposing of the protection portion to entirely cover one surface of the current collecting electrode in the first direction may mean that when the all solid state battery 100 according to the present disclosure is viewed from the first direction (X direction), only the protection portion is seen and the current collecting electrode is not seen because it is hidden by the protection portion. That is, the first protection portion 141b may be disposed not to expose the first current collecting electrode 141a in the first direction, and the second protection portion 142b may be disposed not to expose the second current collecting electrode 142a in the first direction (X direction). In this way, when the first protection portion 141b is disposed to cover the first current collecting electrode 141a and the second protection portion 142b is disposed to cover the second current collecting electrode 142a, it is possible to reduce an area in which the lead electrodes are exposed to the outside, thereby minimizing a route through which moisture penetrates from the outside. In one example, an element entirely covering a surface may mean that the element exactly covers the entire surface, or the element covers the entire surface or substantially covers the entire surface except for one or more spots of the surface due to, for example, a process error recognizable by one of ordinary skill in the art.

In addition, in the all solid state battery 100 according to an exemplary embodiment of the present disclosure, the first protection portion 141b may be disposed to cover the first surface S1 of the electrode assembly 120, and the second protection portion 142b may be disposed to cover the second surface S2 of the electrode assembly 120. Thus, the first current collecting electrode 141a may be disposed in contact with the first surface S1 of the electrode assembly 120, and the first protection portion 141b may be disposed to cover the first current collecting electrode 141a. In addition, the second current collecting electrode 142a may be disposed in contact with the second surface S2 of the electrode assembly 120, and the second protection portion 142b may be disposed to cover the second current collecting electrode 142a. That is, the first current collecting electrode 141a may be disposed on the first surface S1 of the electrode assembly 120 to be connected to the cathode 121, and the second current collecting electrode 142a may be disposed on the second surface S2 of the electrode assembly 120 to be connected to the anode 122.

Figure 7:
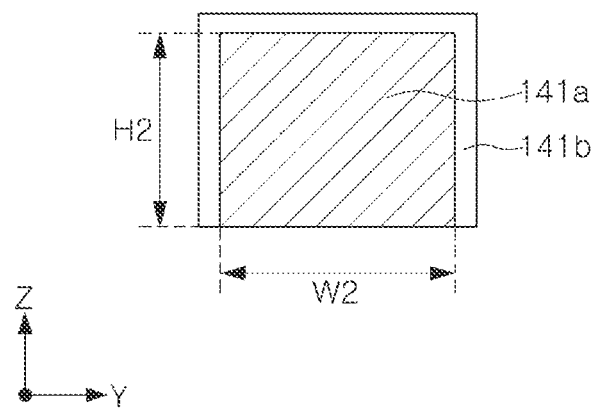
FIG. 7 is a view illustrating the inside of a first connection portion of FIG. 1.

In an exemplary embodiment of the present disclosure, in the all solid state battery 100, a maximum value of a width of the first current collecting electrode 141a and/or the second current collecting electrode 142a in the second direction (Y direction) may be smaller than that of the battery body 110. FIG. 7 schematically illustrates a cross-sectional view of the first connection portion 141 according to an exemplary embodiment of the present disclosure. In the present specification, the description of the first connection portion 141 may be identically applied for the second connection portion 142. Referring to FIGS. 1 and 7, a maximum value W2 of the width of the first current collecting electrode 141a of the first connection portion 141 and/or the second current collecting electrode 142a of the second connection portion 142 in the second direction (Y direction) may be smaller than a maximum value W1 of the width of the battery body 110 in the second direction (Y direction). That is, the relationship between W1 and W2 may satisfy W2<W1. In the present specification, a maximum value of a width of a certain member may refer to a maximum value among values of widths measured at five arbitrary locations of the member in a direction parallel to the second direction (Y direction), and may be a value of a width measured at room temperature (25° C.) and at normal pressure (1 atmosphere). When the maximum value of the width of the first current collecting electrode 141a and/or the second current collecting electrode 142a in the second direction (Y direction) is smaller than that of the battery body 110, the first current collecting electrode 141a and/or the second current collecting electrode 142a can be prevented from being exposed in the second direction (Y direction) of the all solid state battery 100 according to the present disclosure, thereby further improving moisture resistance.

In an exemplary embodiment, a maximum value of a height of the first current collecting electrode 141a and/or the second current collecting electrode 142a in the third direction (Z direction) may be smaller than that of the battery body 110 according to the present disclosure. Referring to FIGS. 1 and 7, a maximum value H2 of the height of the first current collecting electrode 141a of the first connection portion 141 and/or the second current collecting electrode 142a of the second connection portion 142 in the third direction (Z direction) may be smaller than a maximum value H1 of the height of the battery body 110 in the third direction (Z direction). That is, the relationship between H1 and H2 may satisfy H2<H1. In the present specification, a maximum value of a height of a certain member may refer to a maximum value among values of heights measured at five arbitrary locations of the member in a direction parallel to the third direction (Z direction), and may be a value of a height measured at room temperature (25° C.) and at normal pressure (1 atmosphere). When the maximum value of the height of the first current collecting electrode 141a and/or the second current collecting electrode 142a in the third direction (Z direction) is smaller than that of the battery body 110, the first current collecting electrode 141a and/or the second current collecting electrode 142a can be exposed only to one surface of the all solid state battery 100 in the third direction (Z direction) according to the present disclosure, thereby reducing a possibility of moisture penetration.

When the first protection portion 141b is disposed to entirely cover one surface of the first current collecting electrode 141a in the first direction (X direction) and the second protection portion 142b is disposed to entirely cover one surface of the second current collecting electrode 142a in the first direction (X direction) as described above, a height of the first protection portion 141b and/or the second protection portion 142b in the third direction (Z direction) may be equal to the maximum value H1 of the height of the battery body 110 in the third direction (Z direction). That is, the first protection portion 141b and the second protection portion 142b may be disposed on both surfaces of the battery body 110 in the first direction, respectively, to entirely cover the battery body 110 at least in the thickness direction.

In addition, when the first protection portion 141b is disposed to entirely cover one surface of the first current collecting electrode 141a in the first direction (X direction) and the second protection portion 142b is disposed to entirely cover one surface of the second current collecting electrode 142a in the first direction (X direction) as described above, a width of the first protection portion 141b and/or the second protection portion 142b in the second direction (Y direction) may be equal to the maximum value W1 of the width of the battery body 110 in the second direction (Y direction). That is, the first protection portion 141b and the second protection portion 142b may be disposed on both surfaces of the battery body 110 in the first direction, respectively, to entirely cover the battery body 110 at least in the width direction.

In addition, in an exemplary embodiment of the present disclosure, when the first protection portion 141b is disposed to entirely cover one surface of the first current collecting electrode 141a in the first direction (X direction) and the second protection portion 142b is disposed to entirely cover one surface of the second current collecting electrode 142a in the first direction (X direction), the first protection portion 141b and the second protection portion 142b may be disposed to entirely cover both surfaces of the battery body 110 in the first direction, respectively.

In an exemplary embodiment of the present disclosure, the battery body 110 of the all solid state battery 100 according to the present disclosure may include an electrode assembly 120, a first margin portion 131, and a second margin portion 132. The electrode assembly 120 may include a solid electrolyte layer 111, and a cathode 121 and an anode 122 stacked in the third direction (Z direction) with the solid electrolyte layer 111 interposed therebetween.

The cathode and anode 121 and 122 may be stacked to be exposed to both opposite ends of the battery body 110, respectively, each being viewed in a cross section. Specifically, the cathode and anode 121 and 122 may be exposed to both surfaces of the battery body 110 in the first direction (X direction), respectively, and the cathode 121 may be exposed in a direction toward the first surface S1 of the electrode assembly 120 and the anode 122 may be exposed in a direction toward the second surface S2 of the electrode assembly 120.

Figure 3:
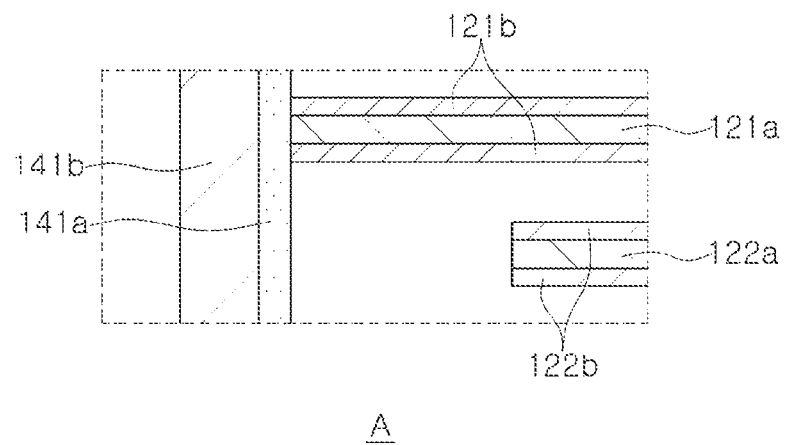
FIG. 3 is an enlarged view of area A of FIG. 2.
Figure 4:
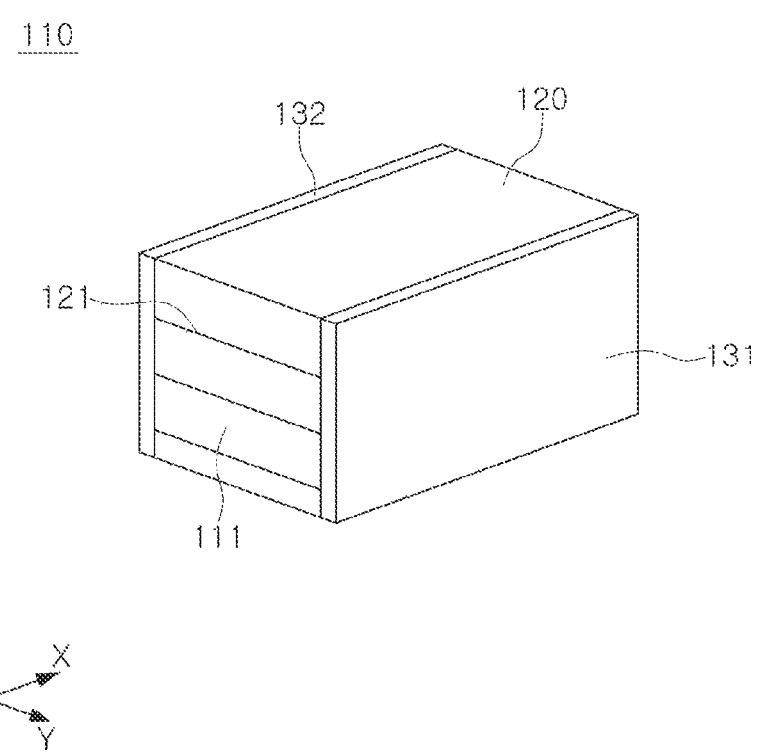
FIG. 4 is a perspective view schematically illustrating a battery body of FIG. 1.
Figure 5:
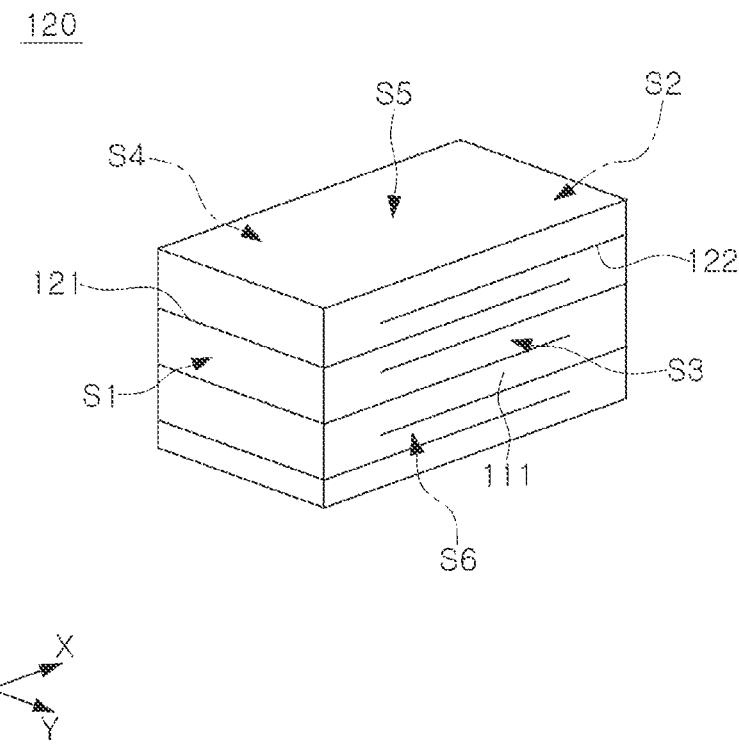
FIG. 5 is a perspective view schematically illustrating an electrode assembly of FIG. 4.
Figure 6:
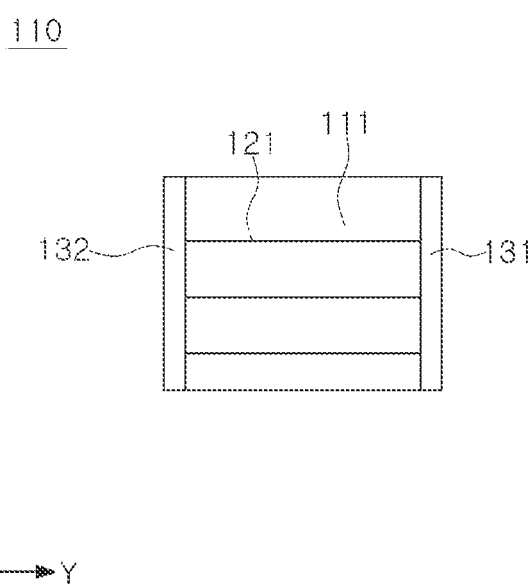
FIG. 6 is a front view of FIG. 4 as viewed in an X direction.

In an exemplary embodiment, the cathode 121 of the all solid state battery 100 according to the present disclosure may include a cathode current collector 121a and a cathode active material 121b. FIG. 3 is an enlarged view of area A of FIG. 2. Referring to FIG. 3, the cathode 121 of the all solid state battery 100 in the present exemplary embodiment may have a structure in which the cathode active material 121b is disposed on both surfaces of the cathode current collector 121a in the third direction.

In an exemplary embodiment of the present disclosure, the cathode active material 121b included in the cathode 121 is not particularly limited as long as it is capable of securing a sufficient capacity. Examples of the cathode active material 121b may include one or more selected from the group consisting of a lithium cobalt oxide, a lithium nickel cobalt manganese oxide, a lithium nickel cobalt aluminum oxide, a lithium iron phosphate oxide, and a lithium manganese oxide, but are not necessarily limited thereto, and any type of cathode active material available in the art may be used.

Examples of the cathode active material may be compounds represented by the following formulas: $Li_aA_{1-b}M_bD_2$ (where $0.90 \leq a \leq 1.8$ and $0 \leq b \leq 0.5$); $Li_aE_{1-b}M_bO_{2-c}D_c$ (where $0.90 \leq a \leq 1.8$, $0 \leq b \leq 0.5$, and $0 \leq c \leq 0.05$); $LiE_{2-b}M_bO_{4-c}D_c$ (where $0 \leq b \leq 0.5$ and $0 \leq c \leq 0.05$); $Li_aNi_{1-b-c}Co_bM_cD_\alpha$ (where $0.90 \leq a \leq 1.8$, $0 \leq b \leq 0.5$, $0 \leq c \leq 0.05$, and $0 \leq \alpha \leq 2$); $Li_aNi_{1-b-c}Co_bM_cO_{2-\alpha}X_\alpha$ (where $0.90 \leq a \leq 1.8$, $0 \leq b \leq 0.5$, $0 \leq c \leq 0.05$, and $0 \leq \alpha \leq 2$); $Li_aNi_{1-b-c}Co_bM_cO_{2-\alpha}X_2$ (where $0.90 \leq a \leq 1.8$, $0 \leq b \leq 0.5$, $0 \leq c \leq 0.05$, and $0 < \alpha < 2$); $Li_aNi_{1-b-c}Mn_bM_cD_\alpha$ (where $0.90 \leq a \leq 1.8$, $0 \leq b \leq 0.5$, $0 \leq c \leq 0.05$, and $0 < \alpha \leq 2$); $Li_aNi_{1-b-c}Mn_bM_cO_{2-\alpha}X_\alpha$ (where $0.90 \leq a \leq 1.8$, $0 \leq b \leq 0.5$, $0 \leq c \leq 0.05$, and $0 < \alpha < 2$); $Li_aNi_{1-b-c}Mn_bM_cO_{2-\alpha}X_2$ (where $0.90 \leq a \leq 1.8$, $0 \leq b \leq 0.5$, $0 \leq c \leq 0.05$, and $0 \leq \alpha \leq 2$); $Li_aN_ib E_c G_d O_2$ (where $0.90 \leq a \leq 1.8$, $0 \leq b \leq 0.9$, $0 \leq c \leq 0.5$, and $0.001 \leq d \leq 0.1$); $Li_aNi_bCo_cMn_dG_eO_2$ (where $0.90 \leq a \leq 1.8$, $0 \leq b \leq 0.9$, $0 \leq c \leq 0.5$, $0 \leq d \leq 0.5$, and $0.001 \leq e \leq 0.1$); $Li_aNiG_bO_2$ (where $0.90 \leq a \leq 1.8$ and $0.001 \leq b \leq 0.1$); $Li_aCoG_bO_2$ (where $0.90 \leq a \leq 1.8$ and $0.001 \leq b \leq 0.1$); $Li_aMnG_bO_2$ (where $0.90 \leq a \leq 1.8$ and $0.001 \leq b \leq 0.1$); $Li_aMn_2G_bO_4$ (where $0.90 \leq a \leq 1.8$ and $0.001 \leq b \leq 0.1$); $QO_2$; $QS_2$; $LiQS_2$; $V_2O_5$; $LiV_2O_5$; $LiRO_2$; $LiNiVO_4$; $Li_{(3-f)}J_2(PO_4)_3$ (where $0 \leq f \leq 2$); $Li_{(3-f)}Fe_2(PO_4)_3$ (where $0 \leq f \leq 2$); and $LiFePO_4$, in which A is Ni, Co, or Mn; M is Al, Ni, Co, Mn, Cr, Fe, Mg, Sr, V, or a rare earth element; D is O, F, S, or P; E is Co or Mn; X is F, S, or P; G is Al, Cr, Mn, Fe, Mg, La, Ce, Sr, or V; Q is Ti, Mo, or Mn; R is Cr, V, Fe, Sc, or Y; and J is V, Cr, Mn, Co, Ni, or Cu.

The cathode active material may also be $LiCoO_2$, $LiMn_xO_{2x}$ (where x=1 or 2), $LiNi_{1-x}Mn_xO_{2x}$ (where $0 < x < 1$), $LiNi_{1-x-y}Co_xMn_yO_2$ (where $0 \leq x \leq 0.5$ and $0 \leq y \leq 0.5$), $LiFePO_4$, $TiS_2$, $FeS_2$, $TiS_3$, or $FeS_3$, but is not limited thereto.

As the cathode current collector, a porous body in a net-shaped type, a mesh type, or the like may be used, and a porous metal plate made of stainless steel, nickel, aluminum, or the like may be used, but the cathode current collector is not limited thereto. In addition, the cathode current collector may be coated with an anti-oxidation metal or alloy film to prevent oxidation.

The cathode of the all solid state battery according to the present disclosure may optionally include a conductive agent and a binder. The conductive agent is not particularly limited as long as it has conductivity without causing a chemical change in the all solid state battery according to the present disclosure. For example, the following conductive material may be used: graphite such as natural graphite or artificial graphite; a carbon-based material such as carbon black, acetylene black, ketjen black, channel black, furnace black, lamp black, or thermal black; a conductive fiber such as a carbon fiber and a metal fiber; carbon fluoride; metal powder such as aluminum or nickel powder; a conductive whisker such as a zinc oxide or potassium titanate whisker; a conductive metal oxide such as a titanium oxide; or a polyphenylene derivative.

The binder may be used to improve a bonding strength between the active material and the conductive agent. Examples of the binder may include polyvinylidene fluoride, polyvinyl alcohol, carboxymethylcellulose (CMC), starch, hydroxypropylcellulose, regenerated cellulose, polyvinylpyrrolidone, polytetrafluoroethylene, polyethylene, polypropylene, ethylene-propylene-diene terpolymer (EPDM), sulfonated EPDM, styrene butadiene rubber, fluorine rubber, and various copolymers, but are not limited thereto.

The cathode applied to the secondary battery according to the present disclosure may be manufactured by directly coating and drying a composition containing a cathode active material on a cathode current collector including metal such as copper. Alternatively, the cathode may be manufactured by casting a cathode active material composition on a separate support and then curing the cathode active material composition, and in this case, a separate cathode current collector may not be included.

The anode 122 of the all solid state battery 100 according to the present disclosure may include an anode current collector 122a and an anode active material 122b. FIG. 3 is an enlarged view of area A of FIG. 2. Referring to FIG. 3, the anode 122 of the all solid state battery 100 in the present exemplary embodiment may have a structure in which the anode active material 122b is disposed on both surfaces of the anode current collector 122a in the third direction.

The anode included in the all solid state battery according to the present disclosure may include a commonly used anode active material. For the anode active material, a carbon-based material, silicon, a silicon oxide, a silicon-based alloy, a silicon-carbon-based composite material, tin, a tin-based alloy, a tin-carbon composite, a metal oxide, or a combination thereof may be used, and the anode active material may include a lithium metal and/or a lithium metal alloy.

The lithium metal alloy may include lithium and metal/metalloid alloyable with lithium. Examples of the metal/metalloid alloyable lithium may be Si, Sn, Al, Ge, Pb, Bi, Sb, an Si—Y alloy (where Y is an alkali metal, an alkali earth metal, a Group 13 to 16 element, a transition metal, a rare earth element, or a combination thereof, and does not include Si), an Sn—Y alloy (where Y is an alkali metal, an alkali earth metal, a Group 13 to 16 element, a transition metal, a transition metal oxide such as a lithium titanium oxide ($Li_4Ti_5O_{12}$), a rare earth element, or a combination thereof, and does not include Sn), and MnOx (where $0 < x \leq 2$). The element Y may be Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po, or a combination thereof.

In addition, the metal/metalloid oxide alloyable with lithium may be a lithium titanium oxide, a vanadium oxide, a lithium vanadium oxide, $SnO_2$, $SiO_x$ (where $0 < x < 2$), or the like. For example, the anode active material may include one or more elements selected from the group consisting of Group 13 to 16 elements of the periodic table of elements. Examples of the anode active material may include one or more elements selected from the group consisting of Si, Ge, and Sn.

The carbon-based material may be crystalline carbon, amorphous carbon, or a mixture thereof. The crystalline carbon may be graphite such as natural graphite or artificial graphite in a shapeless, plate-like, flake, spherical, or fibrous form. In addition, the amorphous carbon may be soft carbon (low-temperature fired carbon), hard carbon, mesophase pitch carbide, fired cokes, graphene, carbon black, fullerene soot, carbon nanotubes, or carbon fibers, but is not limited thereto.

The silicon may be selected from the group consisting of Si, SiOx (where $0 < x < 2$, for example 0.5 to 1.5), Sn, $SnO_2$, a silicon-containing metal alloy, and a mixture thereof.

Examples of the silicon-containing metal alloy may include one or more of Al, Sn, Ag, Fe, Bi, Mg, Zn, In, Ge, Pb, and Ti, together with silicon.

The anode current collector of the all solid state battery according to the present disclosure may have the same configuration as the cathode current collector. As the anode current collector, for example, a porous body in a net-shaped type, a mesh type, or the like may be used, and a porous metal plate made of stainless steel, nickel, aluminum, or the like may be used, but the anode current collector is not limited thereto. In addition, the anode current collector may be coated with an anti-oxidation metal or alloy film to prevent oxidation.

The anode may be manufactured according to almost the same method as the cathode as described above, except that the anode active material is used instead of the cathode active material.

In an exemplary embodiment of the present disclosure, the solid electrolyte layer according to the present disclosure may be formed of one or more selected from the group consisting of a Garnet-type solid electrolyte, a Nasicon-type solid electrolyte, a LISICON-type solid electrolyte, a perovskite-type solid electrolyte, and a LiPON-type solid electrolyte.

The Garnet-type solid electrolyte may refer to lithium lanthanum zirconium oxide (LLZO) represented by $Li_aLa_bZr_cO_{12}$ such as $Li_7La_3Zr_2O_{12}$, and the Nasicon-type solid electrolyte may refer to lithium aluminum titanium phosphate (LATP) represented by $Li_{1+x}Al_xTi_{2-x}(PO_4)_3$ (where $0<x<1$), which is a compound of $Li_{1+x}Al_xM_{2-x}(PO_4)_3$ (LAMP) (where $0<x<2$ and M is Zr, Ti, or Ge) with Ti introduced thereinto, lithium aluminum germanium phosphate (LAGP) represented by $Li_{1+x}Al_xGe_{2-x}(PO_4)_3$ (where $0<x<1$) such as $Li_{1.3}Al_{0.3}Ti_{1.7}(PO_4)_3$ with an excessive amount of lithium introduced thereinto, and/or lithium zirconium phosphate (LZP) represented by $LiZr_2(PO_4)_3$.

The LISICON-type solid electrolyte may be represented by $xLi_3AO_4$-$(1-x)$ $Li_4BO_4$ (where A is P, As, V, or the like, and B is Si, Ge, Ti, or the like), and may refer to a solid solution oxide, including $Li_4Zn(G_eO_4)_4$, $Li_{10}GeP_2O_{12}$ (LGPO), $Li_{3.5}Si_{0.5}P_{0.5}O_4$, $Li_{10.42}Si(Ge)_{1.5}P_{1.5}Cl_{0.08}O_{11.92}$, or the like, or a solid solution sulfide represented by $Li_{4-x}M_{1-y}M'_yS_4$ (where M is Si or Ge, and M' is P, Al, Zn, or Ga), including $Li_2S$—$P_2S_5$, $Li_2S$—$SiS_2$, $Li_2S$—$SiS_2$—$P_2S_5$, $Li_2S$—$GeS_2$, or the like.

The perovskite-type solid electrolyte may refer to lithium lanthanum titanate oxide (LLTO) represented by $Li_{3x}La_{2/3-x}\square_{1/3-2x}TiO_3$ (where $0<x<0.16$, $\square$ denotes a vacancy), such as $Li_{1/8}La_{5/8}TiO_3$, and the LiPON-type solid electrolyte may refer to a nitride like lithium phosphorous oxynitride such as $Li_{2.8}PO_{3.3}N_{0.46}$.

The battery body 110 of the all solid state battery 100 according to the present disclosure may include a first margin portion 131 disposed on the third surface S3 of the electrode assembly 120 and a second margin portion 132 disposed on the fourth surface S4 of the electrode assembly 120. The first margin portion 131 and the second margin portion 132 may include a ceramic material, for example, alumina ($Al_2O_3$), aluminum nitride (AlN), beryllium oxide (BeO), boron nitride (BN), silicon (Si), silicon carbide (SiC), silica ($SiO_2$), silicon nitride ($Si_3N_4$), gallium arsenide (GaAs), gallium nitride (GaN), barium titanate ($BaTiO_3$), zirconium dioxide ($ZrO_2$), a mixture thereof, an oxide thereof, and/or a nitride thereof, or any other suitable ceramic material, but is not limited thereto. Further, the first margin portion 131 and the second margin portion 132 may include one or more of the above-described solid electrolytes, but are not limited thereto.

The first margin portion 131 and the second margin portion 132 may be formed by applying a slurry containing the ceramic material to the surfaces of the electrode assembly 120 in the second direction (Y direction), or by attaching one or more sheets formed of the ceramic material to the surfaces of the electrode assembly 120 in the second direction (Y direction). The first margin portion 131 and the second margin portion 132 may fundamentally serve to prevent damage to the electrode assembly 120 due to physical or chemical stress.

In the all solid state battery 100 according to an exemplary embodiment of the present disclosure, the first connection portion 141 and the second connection portion 142 may be disposed on both surfaces of the battery body 110 in the first direction (X direction), respectively. The first connection portion 141 and the second connection portion 142 may have dimensions and areas corresponding to both surfaces of the battery body 110 in the first direction (X direction), respectively. As described above, the first connection portion 141 may be disposed to cover the first surface of the electrode assembly 120, and the second connection portion 142 may be disposed to cover the second surface of the electrode assembly 120.

The first connection portion 141 may include a first current collecting electrode 141a, and the second connection portion 142 may include a second current collecting electrode 142a. The first current collecting electrode 141a may be connected to the cathode 121, and the second current collecting electrode 142a may be connected to the anode 122. A material for forming the first current collecting electrode 141a and the second current collecting electrode 142a is not particularly limited, and the first current collecting electrode 141a and the second current collecting electrode 142a may be formed by using a conductive paste including one or more conductive metals of silver (Ag), palladium (Pd), gold (Au), platinum (Pt), nickel (Ni), copper (Cu), tin (Sn), tungsten (W), titanium (Ti), and an alloy thereof.

The first connection portion 141 may include a first protection portion 141b, and the second connection portion 142 may include a second protection portion 142b. The first protection portion 141b and the second protection portion 142b may include a ceramic material, and may include the same ceramic material as the first margin portion 131 and the second margin portion 132 of the battery body 110. When the first protection portion 141b and the second protection portion 142b includes the same ceramic material as the first margin portion 131 and the second margin portion 132, they all may show similar sintering behavior, thereby reducing the internal stress of the completed all solid state battery. In this case, the first protection portion 141b may be an insulating layer and the second connection portion 142 may be an insulating layer.

In addition, in another exemplary embodiment of the present disclosure, the first protection portion 141b and/or the second protection portion 142b of the first connection portion 141 and/or and the second connection portion 142 of the all solid state battery 100 according to the present disclosure may include a ceramic ingredient of a different composition from that of the first margin portion 131 and the second margin portion 132 of the battery body 110. The first protection portion 141b and the second protection portion 142b, which are disposed on the first current collecting electrode 141a and the second current collecting electrode 142a, respectively, are in contact with the metal ingredient in a large area thereof when brought into contact with the battery body 110. A bonding strength at an interface between the dissimilar ingredients, i.e. the metal and the ceramic material, may weaken due to shrinkage and the like in the sintering process. When controlling the sintering behavior by adjusting the ingredient of the first protection portion 141*b* and the second protection portion 142*b* as in the present exemplary embodiment, the bonding strength between the first and second protection portions 141*b* and 142*b* and the first and second current collecting electrodes 141*a* and 142*a* can be improved, and accordingly, the reliability of the battery can be improved.

The method of manufacturing the all solid state battery according to the present disclosure is not particularly limited, but the all solid state battery may be formed by, for example, forming the first margin portion 131 on the third surface S3 of the electrode assembly 120, forming the second margin portion 142 on the fourth surface S4, and then forming the first connection portion 141 and the second connection portion 142. The first connection portion 141 and the second connection portion 132 may be formed by applying and drying a conductive paste on both surfaces of the battery body 110 in the first direction (X direction) to form a first current collecting electrode 141*a* and a second current collecting electrode 142*a*, applying and drying a ceramic paste or transferring a ceramic sheet on the dried conductive paste to form a first protection portion 141*b* and a second protection portion 142*b*, and then performing sintering.

Alternatively, the first connection portion 141 and the second connection portion 142 may be manufactured by printing the first and second current collecting electrodes 141*a* and 142*a* on the first and second protection portions 141*b* and 142*b* such as ceramic sheets that are manufactured in advance, attaching the first and second protection portions 141*b* and 142*b* with the first and second current collecting electrodes 141*a* and 142*a* to both surfaces of the battery body 110 in the first direction (X direction), and then performing sintering. As described above, the all solid state battery 100 according to the present disclosure can be manufactured through a single sintering process after forming the first connection portion 141 and the second connection portion 142 on the battery body 110, without requiring a firing process for forming a separate external electrode, thereby simplifying the process.

In an exemplary embodiment of the present disclosure, the all solid state battery 100 according to the present disclosure may further include a first terminal electrode 151 connected to the first current collecting electrode 141*a* and a second terminal electrode 152 connected to the second current collecting electrode 142*a*. In this case, the first terminal electrode 151 and the second terminal electrode 152 may be disposed to be spaced apart from each other on a surface to which the first current collecting electrode 141*a* and the second current collecting electrode 142*a* are drawn out. Referring to FIGS. 1 and 2, the first current collecting electrode 141*a* and the second current collecting electrode 142*a* may be drawn out to one surface of the all solid state battery 100 in the third direction (Z direction), and the first terminal electrode 151 connected to the first current collecting electrode 141*a* and the second terminal electrode 152 connected to the second current collecting electrode 142*a* may be disposed thereon.

The first and second terminal electrodes 151 and 152 are formed, for example, by applying a paste for terminal electrodes including a conductive metal on lead portions of the first current collecting electrode 141*a* and the second current collecting electrode 142*a*, or by applying a paste or powder for terminal electrodes on the first current collecting electrode 141*a* and the second current collecting electrode 142*a* of the battery body 110 of which sintering is completed and then firing the paste or powder through induction heating or the like. Also, the first and second terminal electrodes 151 and 152 may be formed by sputtering or electroplating a conductive metal on the lead portions of the first current collecting electrode 141*a* and the second current collecting electrode 142*a*, but are not limited thereto. Examples of the conductive metal may be one or more conductive metals of copper (Cu), nickel (Ni), tin (Sn), palladium (Pd), platinum (Pt), gold (Au), silver (Ag), tungsten (W), titanium (Ti), lead (Pb), and an alloy thereof, but are not limited thereto.

In an exemplary embodiment, the all solid state battery 100 according to the present disclosure may further include a plating layer (not shown) disposed on each of the first terminal electrode 151 and the second terminal electrode 152. The plating layer may include one or more selected from the group consisting of copper (Cu), nickel (Ni), tin (Sn), palladium (Pd), platinum (Pt), gold (Au), silver (Ag), tungsten (W), titanium (Ti), lead (Pb), and an alloy, but is not limited thereto. The plating layer may be formed as a single layer or a plurality of layers through sputtering or electroplating, but is not limited thereto.

Figure 8:
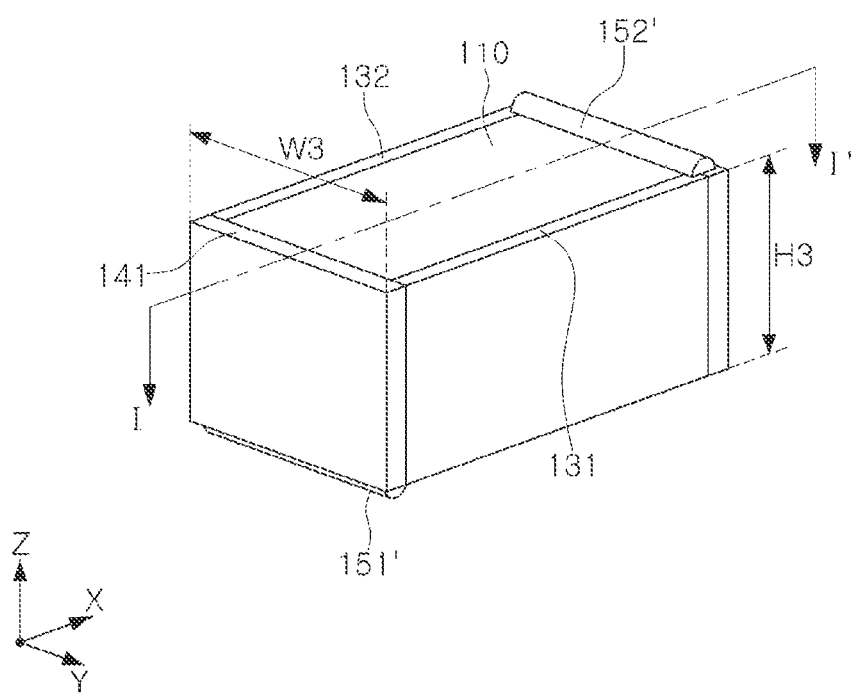
FIG. 8 is a perspective view schematically illustrating a modified example of the all solid state battery according to an exemplary embodiment of the present disclosure.

According to an exemplary embodiment of the present disclosure, the first current collecting electrode 141*a* and the second current collecting electrode 142*a* of the all solid state battery 100 may be drawn out to the opposite surfaces of the battery body 110 in the third direction (Z direction), respectively. FIG. 8 is a perspective view illustrating the all solid state battery 100 according to the present exemplary embodiment. Referring to FIG. 8, the all solid state battery 100 according to the present exemplary embodiment may have a structure in which the first current collecting electrode 141*a* and the second current collecting electrode 142*a* are drawn out in opposite directions. For example, the first current collecting electrode 141*a* may be drawn out in a direction toward an upper surface of the all solid state battery, and the second current collecting electrode 142*a* may be drawn out in a direction toward a lower surface of the all solid state battery.

In this case, when a first terminal electrode 151' is disposed on the first current collecting electrode 141*a* and a second terminal electrode 152' is disposed on the second current collecting electrode 142*a*, the first terminal electrode 151' and the second terminal electrode 152' may also be drawn out to the opposite surfaces of the battery body 110 in the third direction (Z direction), respectively. When the first and second current collecting electrodes are drawn out in different directions as in the present exemplary embodiment, the all solid state battery 100 can be applied between multilayer-structure substrates, thereby increasing space utilization.

In the present exemplary embodiment, the maximum value W2 of the width of the first current collecting electrode 141*a* and/or the second current collecting electrode 142*a* of the all solid state battery 100 in the second direction (Y direction) may be smaller than a maximum value W3 of the width of the battery body 110 in the second direction (Y direction). Also, the maximum value H2 of the height of the first current collecting electrode 141*a* and/or the second current collecting electrode 142*a* of the all solid state battery 100 in the third direction (Z direction) may be smaller than a maximum value H3 of the height of the battery body 110 in the third direction (Z direction).

Figure 9:
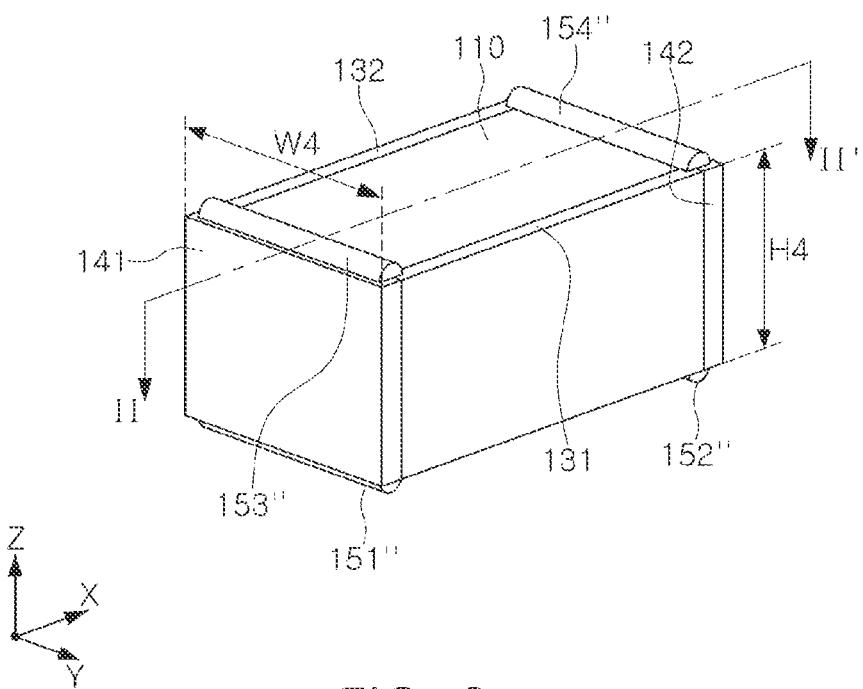
FIG. 9 is a perspective view illustrating a modified example of the all solid state battery according to an exemplary embodiment of the present disclosure.
Figure 10:
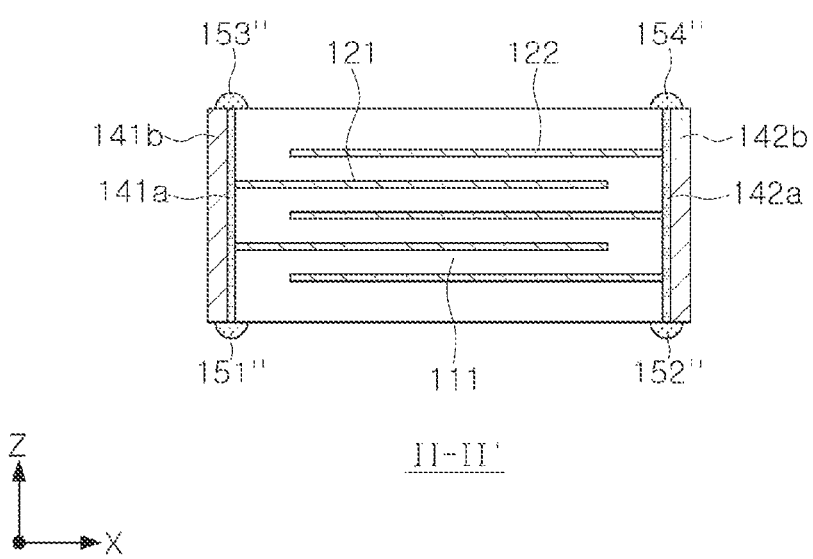
FIG. 10 is a cross-sectional view taken along line II-II' of FIG. 9.
Figure 11:
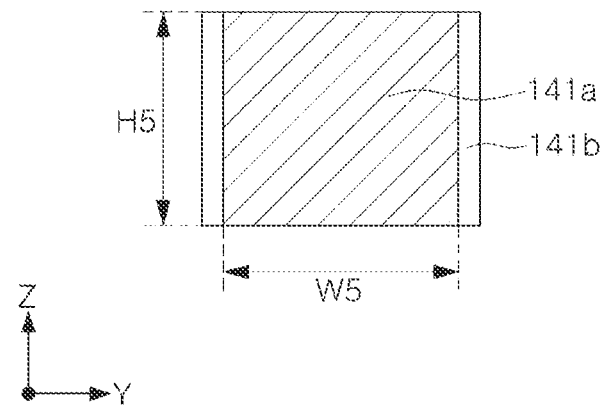
FIG. 11 is a view illustrating the inside of a first connection portion of FIG. 9.
Figure 12:
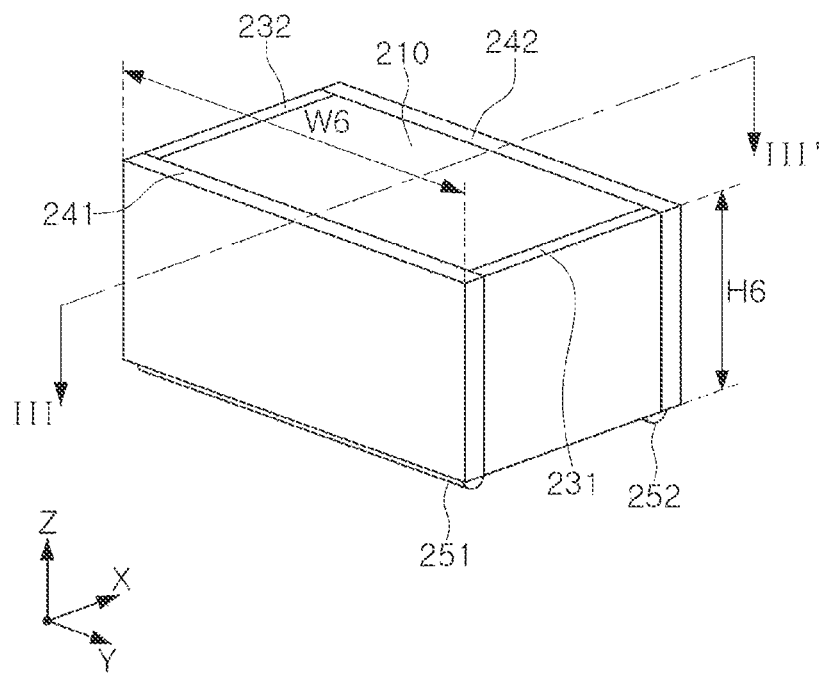
FIG. 12 is a perspective view schematically illustrating an all solid state battery according to another exemplary embodiment of the present disclosure.
Figure 13:
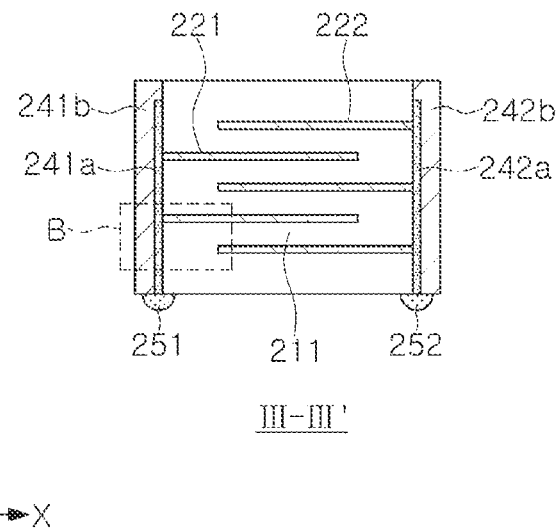
FIG. 13 is a cross-sectional view taken along line III-III' of FIG. 12.
Figure 14:
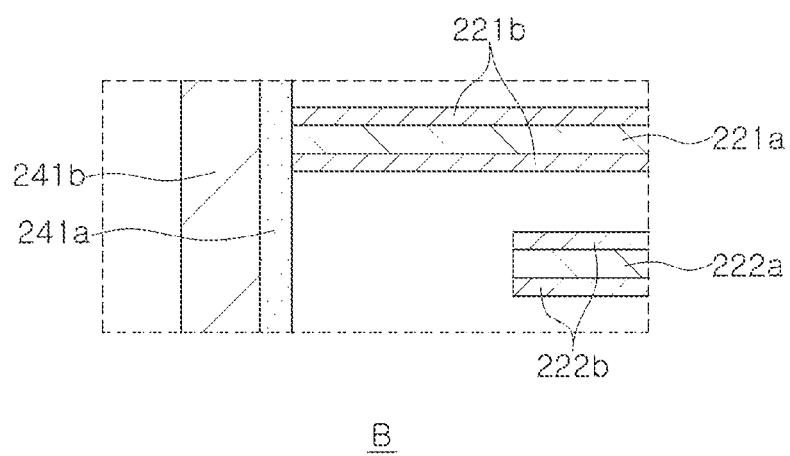
FIG. 14 is an enlarged view of area B of FIG. 13.
Figure 15:
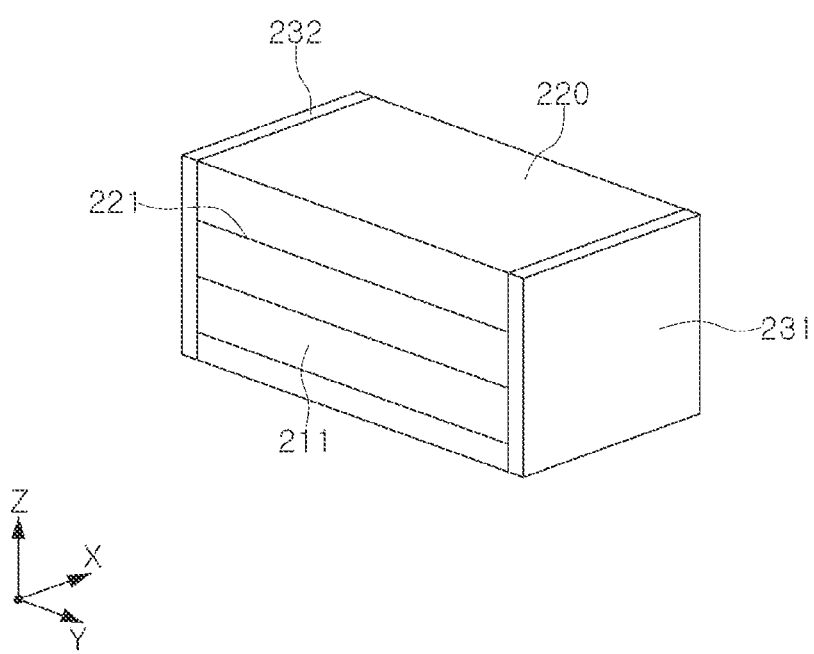
FIG. 15 is a perspective view schematically illustrating a battery body of FIG. 12.
Figure 16:
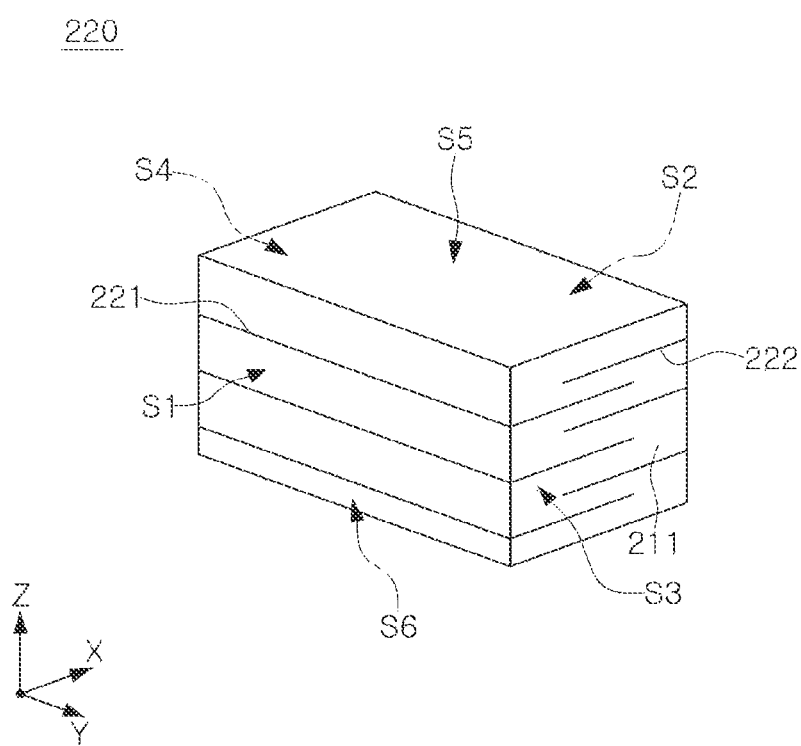
FIG. 16 is a perspective view schematically illustrating an electrode assembly of FIG. 13.
Figure 17:
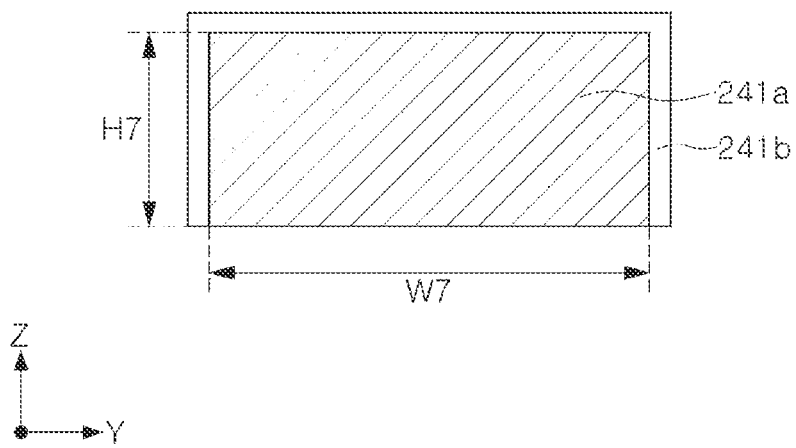
FIG. 17 is a view illustrating the inside of a first connection portion of FIG. 12.

According to another exemplary embodiment of the present disclosure, each of the first current collecting electrode 141a and the second current collecting electrode 142a of the all solid state battery 100 according to the present disclosure may be drawn out to both surfaces of the battery body 110 in the third direction (Z direction). FIGS. 9 through 11 are views schematically illustrating the all solid state battery 100 according to the present exemplary embodiment. Referring to FIGS. 9 through 11, in the all solid state battery 100 according to the present exemplary embodiment, the first connection portion 141 and the second connection portion 142 may be disposed on both surfaces of the electrode assembly 120 in the first direction (X direction) with the first margin portion 131 and the second margin portion 132 disposed on both surfaces thereof in the second direction (Y direction), respectively. Here, the first connection portion 141 may include a first current collecting electrode 141a and a first protection portion 141b, the second connection portion 142 may include a second current collecting electrode 142a and a second protection portion 142b, and each of the first current collecting electrode 141a and the second current collecting electrode 142a may be drawn out to both surface of the battery body 110 in the third direction (Z direction).

In this case, when a first terminal electrode 151" and a third terminal electrode 153" are disposed on the first current collecting electrode 141a and a second terminal electrode 152" and a fourth terminal electrode 154" are disposed on the second current collecting electrode 142a, the first terminal electrode 151" and the third terminal electrode 153" may be drawn out to both surfaces of the battery body 110 in the third direction (Z direction), respectively, and the second terminal electrode 152" and the fourth terminal electrode 154" may also be drawn out to both surfaces of the battery body 110 in the third direction (Z direction), respectively. That is, the all solid state battery 100 according to the present exemplary embodiment may have a structure in which each current collecting electrode of the same polarity is drawn out to two locations, that is, the current collecting electrodes are drawn out to a total of four locations.

In the present exemplary embodiment, a maximum value W5 of the width of the first current collecting electrode 141a and/or the second current collecting electrode 142a of the all solid state battery 100 in the second direction (Y direction) may be smaller than a maximum value W4 of the width of the battery body 110 in the second direction (Y direction).

In an exemplary embodiment, in the all solid state battery 100 according to the present disclosure, a maximum value H5 of the height of each of the first current collecting electrode 141a and the second current collecting electrode 142a in the third direction (Z direction) may be equal to a maximum value H4 of the height of the battery body 110 in the third direction (Z direction). In the present specification, certain lengths, widths, and/or heights may be mentioned as being equal to each other on the premise that there may be a margin of error. Here, the margin of error may refer to ±3 µm or less, ±2 µm or less, or ±1 µm or less, but is not limited thereto.

In an exemplary embodiment, the all solid state battery 100 according to the present disclosure may have a length in the first direction (X direction) larger than a width in the second direction (Y direction). FIGS. 1 through 11 illustrate the all solid state battery 100 based on the structure in the present exemplary embodiment. In the structure in the above-described exemplary embodiment, while the length of the all solid state battery 100 in the first direction (X direction) is larger than the width of the all solid state battery 100 in the second direction (Y direction), the electrodes connected to the outside may be disposed at both end portions of the all solid state battery 100 in the first direction (X direction). In this case, the capacity can be maximized while improving the moisture resistance.

In another exemplary embodiment of the present disclosure, an all solid state battery 200 according to the present disclosure may have a length in the first direction (X direction) smaller than a width in the second direction (Y direction). FIGS. 12 through 17 are views illustrating the all solid state battery 200 according to the present exemplary embodiment. Referring to FIGS. 12 through 17, while the all solid state battery 200 in the present exemplary embodiment has a structure in which the length thereof in the first direction (X direction) is smaller than the width thereof in the second direction (Y direction), a first connection portion 241 may include a first protection portion 241b disposed in contact with a first current collecting electrode 241a, and a second connection portion 242 may include a second protection portion 242b disposed in contact with a second current collecting electrode 242a. In this structure, a distance between the electrodes connected to the outside is relatively short to implement a chip having a low equivalent series inductance (ESL) with a high reliability in moisture resistance.

In the present exemplary embodiment, a maximum value W7 of a width of the first current collecting electrode 241a and/or the second current collecting electrode 242a of the all solid state battery 200 in the second direction (Y direction) may be smaller than a maximum value W6 of a width of a battery body 210 in the second direction (Y direction). Also, a maximum value H7 of a height of the first current collecting electrode 241a and/or the second current collecting electrode 242a in the third direction (Z direction) according to the present disclosure may be smaller than a maximum value H6 of a height of the battery body 210 in the third direction (Z direction).

In the above-described exemplary embodiment, the all solid state battery 200 according to the present disclosure may include a first terminal electrode 251 connected to the first current collecting electrode 241a, and a second terminal electrode 252 connected to the second current collecting electrode 242a.

In an exemplary embodiment, a cathode 221 of the all solid state battery 200 according to the present disclosure may include a cathode current collector 221a and a cathode active material 221b. Also, an anode 222 may include an anode current collector 222a and an anode active material 222b. The description of the cathode 221, the anode 222, and the solid electrolyte layer 211 of the all solid state battery 200 according to the present exemplary embodiment will be omitted, because the same has been described above.

According to an exemplary embodiment of the present disclosure, the first current collecting electrode 241a and the second current collecting electrode 242a of the all solid state battery 200 may be drawn out to the same surface of the battery body 210 in the third direction (Z direction), respectively. In the all solid state battery 200 according to the present exemplary embodiment, the first current collecting electrode 241a and the second current collecting electrode 242a may be drawn out in the same direction. For example, the first current collecting electrode 241a and the second current collecting electrode 242a may be drawn out in a direction toward the upper surface of the all solid state battery or in a direction toward a lower surface of the all solid state battery.

According to an exemplary embodiment of the present disclosure, the first current collecting electrode 241a and the second current collecting electrode 242a of the all solid state battery 200 may be drawn out to the opposite surfaces of the battery body 210 in the third direction (Z direction), respectively. In the all solid state battery 200 according to the present exemplary embodiment, the first current collecting electrode 241a and the second current collecting electrode 242a may be drawn out in opposite directions. For example, the first current collecting electrode 241a may be drawn out in a direction toward an upper surface of the all solid state battery, and the second current collecting electrode 242a may be drawn out in a direction toward a lower surface of the all solid state battery.

According to another exemplary embodiment of the present disclosure, each of the first current collecting electrode 241a and the second current collecting electrode 242a of the all solid state battery 200 according to the present disclosure may be drawn out to both surfaces of the battery body 210 in the third direction (Z direction).

Figure 18:
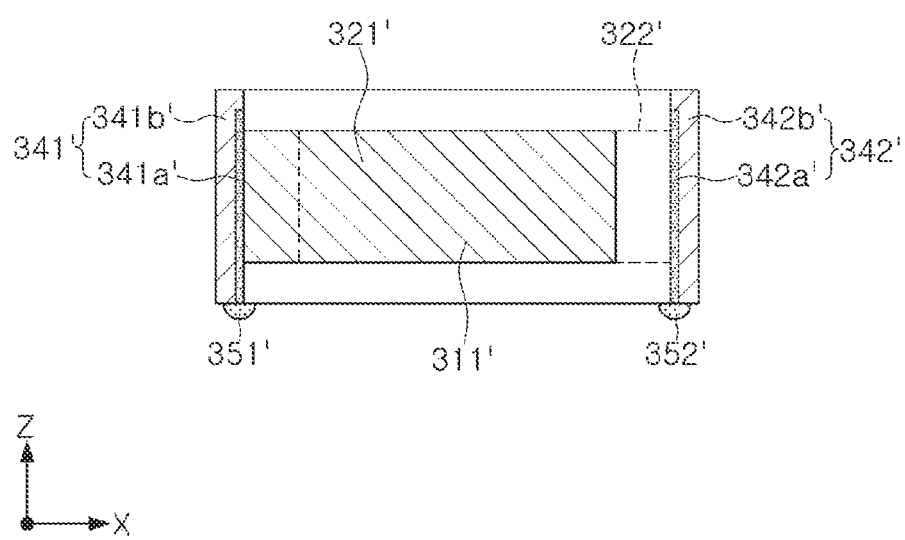
FIG. 18 is a cross-sectional view of an all solid state battery according to another exemplary embodiment of the present disclosure.
Figure 19:
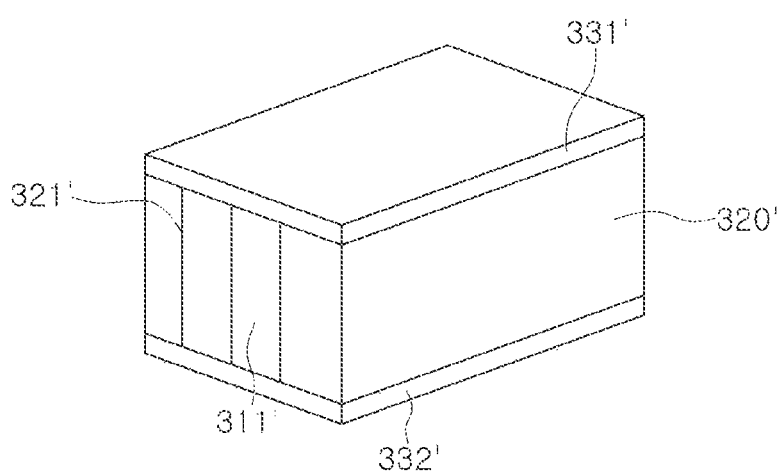
FIG. 19 is a perspective view schematically illustrating a battery body of FIG. 18.

According to another exemplary embodiment of the present disclosure, in an all solid state battery 300 according to the present disclosure, a cathode 321' and an anode 322' may be stacked in the second direction (Y direction) with a solid electrolyte layer 311' disposed therebetween. FIGS. 18 and 19 are drawings illustrating the all solid state battery 300 according to the present exemplary embodiment. Referring to FIGS. 18 and 19, first and second margin portions 331' and 332' may be disposed on both surfaces of an electrode assembly 320 of the all solid state battery 300 in the third direction (Z direction), respectively, in the present exemplary embodiment. In the electrode assembly 320, a solid electrolyte layer 311', the cathode 321', and the anode 322' may be sequentially stacked in the second direction (Y direction). A first connection portion 341' and a second connection portion 342' may be disposed on both surfaces of a battery body 310' in the first direction (X direction), respectively. The first connection portion 341' may include a first current collecting electrode 341a' and a first protection portion 341b', and the second connection portion 342' may include a second current collecting electrode 342a' and a second protection portion 342b'. In this case, the first current collecting electrode 341a and the second current collecting electrode 342a may be drawn out to any one surface of the first connection portion 341 in the third direction (Z direction) and to any one surface of the second connection portion 342 in the third direction (Z direction), respectively.

The all solid state battery 300 according to the above-described exemplary embodiment may have a length in the first direction (X direction) larger than a width in the second direction (Y direction). In the structure in the above-described exemplary embodiment, while the length of the all solid state battery 300 in the first direction (X direction) is larger than the width of the all solid state battery 300 in the second direction (Y direction), the electrodes connected to the outside may be disposed at both end portions of the all solid state battery 300 in the first direction (X direction). In this case, the capacity can be maximized while improving the moisture resistance.

Figure 20:
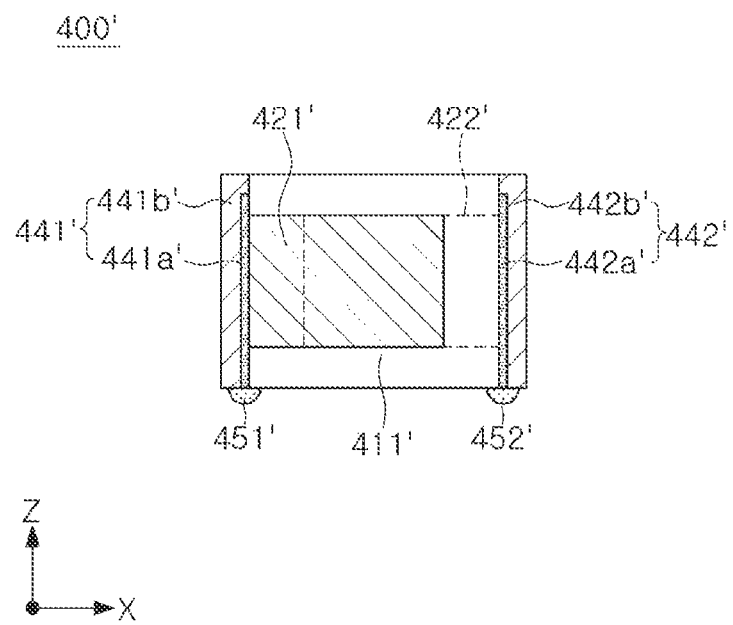
FIG. 20 is a cross-sectional view of an all solid state battery according to another exemplary embodiment of the present disclosure.
Figure 21:
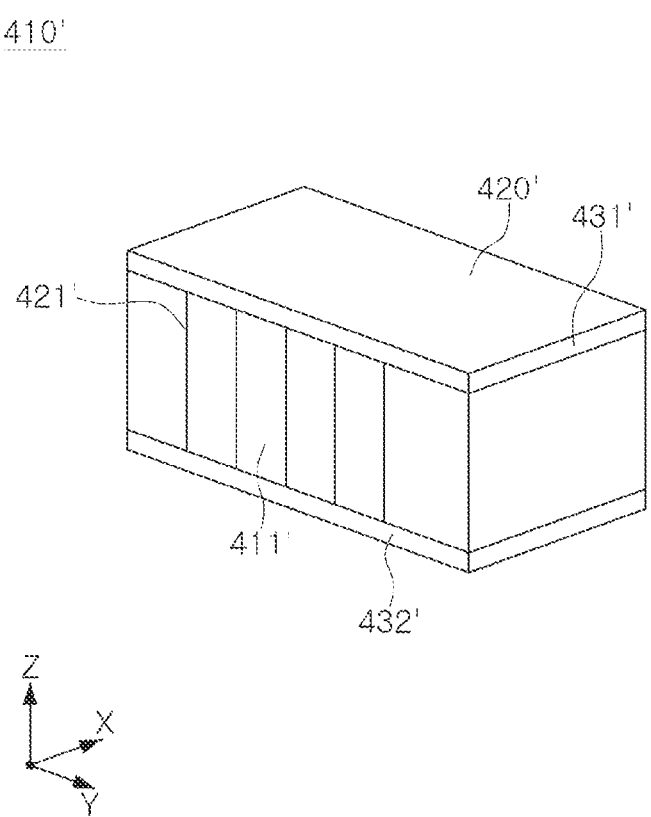
FIG. 21 is a perspective view schematically illustrating a battery body of FIG. 20.

In another exemplary embodiment of the present disclosure, an all solid state battery 400' according to the present disclosure may have a length in the first direction (X direction) smaller than a width in the second direction (Y direction). FIGS. 20 and 21 are views illustrating the all solid state battery 400' according to the present exemplary embodiment. In an all solid state battery 400' according to the present disclosure, a cathode 421' and an anode 422' may be stacked in the second direction (Y direction) with a solid electrolyte layer 411' disposed therebetween. Referring to FIGS. 20 and 21, while the all solid state battery 400 in the present exemplary embodiment has a structure in which the length thereof in the first direction (X direction) is smaller than the width thereof in the second direction (Y direction), a first connection portion 441' may include a first protection portion 441b' disposed in contact with a first current collecting electrode 441a', and a second connection portion 442' may include a second protection portion 442b' disposed in contact with a second current collecting electrode 442a'. In this structure, a distance between the electrodes connected to the outside is relatively short to implement a chip having a low ESL with a high reliability in moisture resistance.

Figure 22:
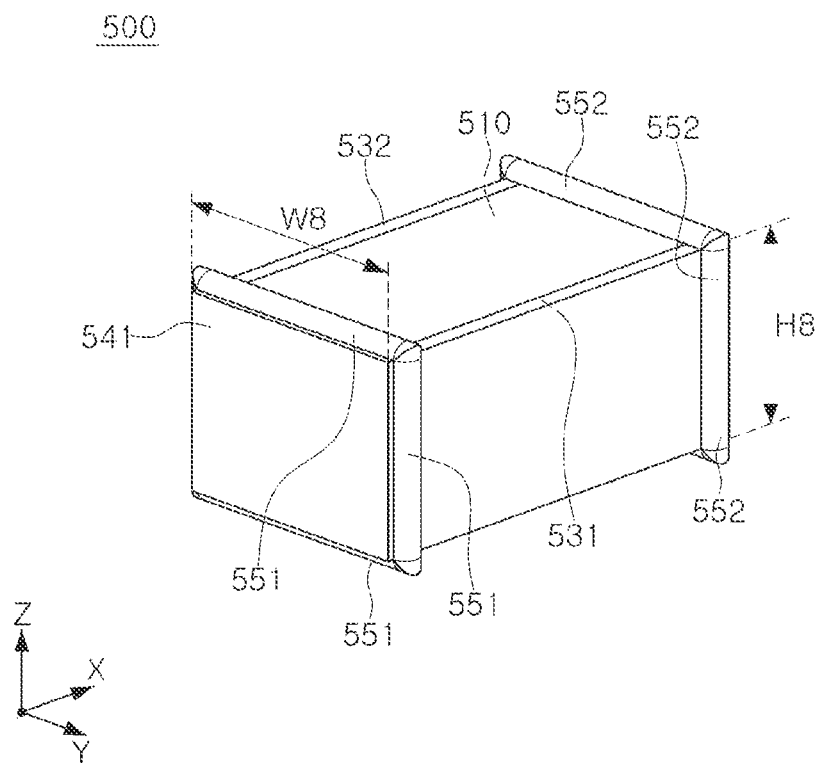
FIG. 22 is a cross-sectional view schematically illustrating an all solid state battery according to another exemplary embodiment of the present disclosure.
Figure 23:
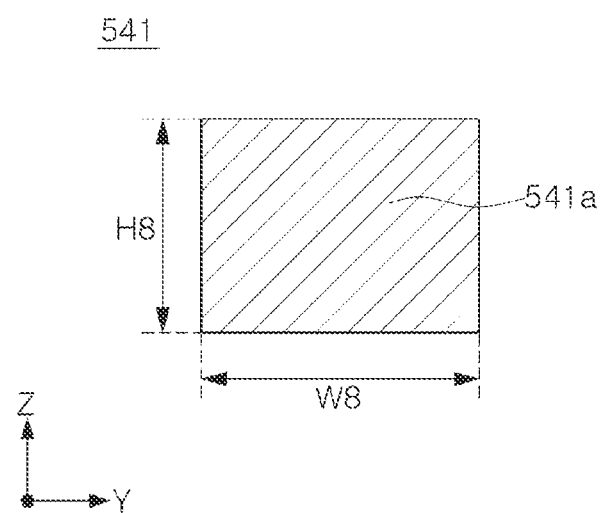
FIG. 23 is a view illustrating the inside of a first connection portion of FIG. 22.
Figure 24:
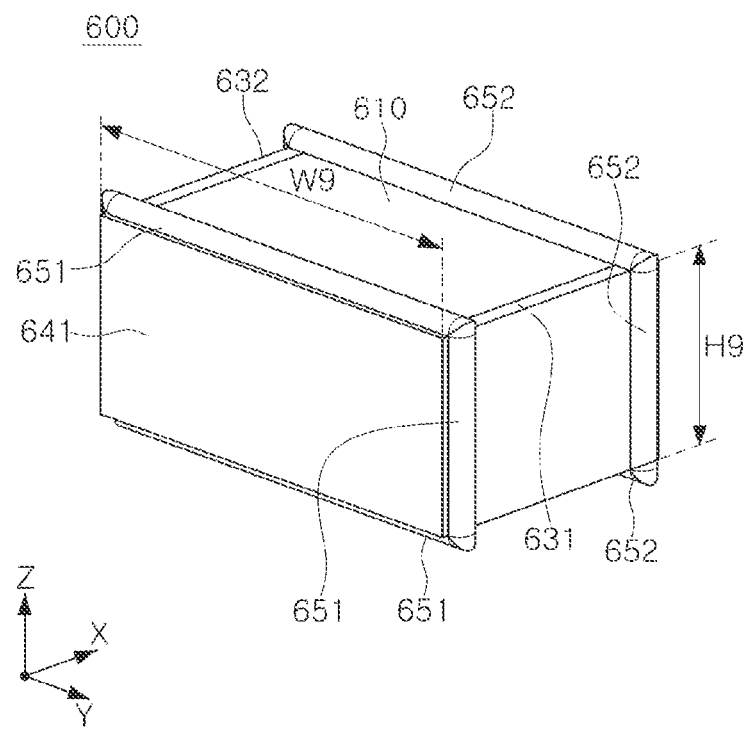
FIG. 24 is a cross-sectional view schematically illustrating an all solid state battery according to another exemplary embodiment of the present disclosure.
Figure 25:
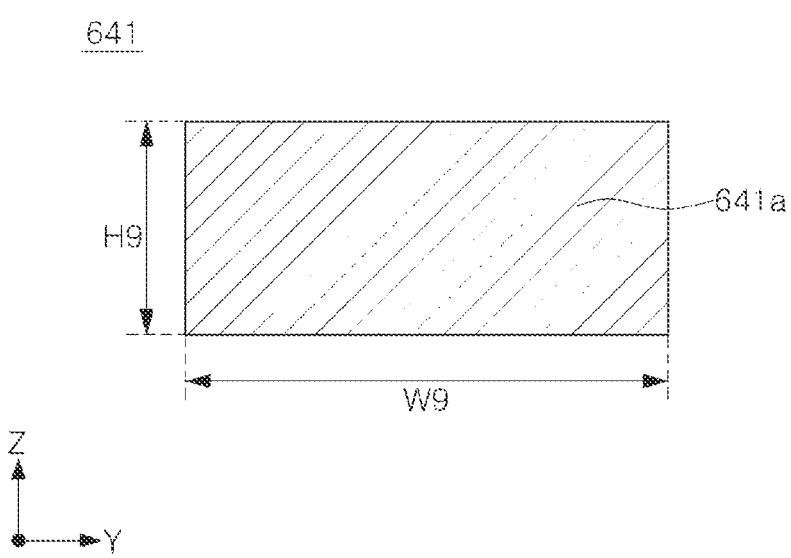
FIG. 25 is a view illustrating the inside of a first connection portion of FIG. 24.

FIGS. 22 and 23 are views illustrating an all solid state battery 500 according to another exemplary embodiment of the present disclosure. Referring to FIGS. 22 and 23, first and second margin portions 531 and 532 may be disposed on both surfaces of an electrode assembly 520 of the all solid state battery 500 in the third direction (Z direction), respectively, in the present exemplary embodiment. In the electrode assembly 520, a solid electrolyte layer 511, a cathode 521, and an anode 522 may be sequentially stacked in the third direction (Z direction). In addition, a first connection portion 541 and a second connection portion 542 may be disposed on both surfaces of a battery body 510 in the first direction (X direction), respectively. The first connection portion 541 may include a first current collecting electrode 541a and a first protection portion 541b, and the second connection portion 542 may include a second current collecting electrode 542a and a second protection portion 542b. In this case, each of the first current collecting electrode 541a and the second current collecting electrode 542a may be drawn out to both surfaces of the battery body 510 in the third direction (Z direction) and to both surfaces of the battery body 510 in the second direction (Y direction).

In the present exemplary example, a maximum value W8 of a width of the first current collecting electrode 541a and/or the second current collecting electrode 542a of the all solid state battery 500 in the second direction (Y direction) may be equal to a maximum value W8 of a width of the battery body 510 in the second direction (Y direction). Also, a maximum value H8 of a height of the first current collecting electrode 541a and/or the second current collecting electrode 542a of the all solid state battery 500 in the third direction (Z direction) may be equal to a maximum value H8 of a height of the battery body 510 in the third direction (Z direction).

In an exemplary embodiment of the present disclosure, the all solid state battery 500 according to the present disclosure may further include a first terminal electrode 551 connected to the first current collecting electrode 541a and a second terminal electrode 552 connected to the second current collecting electrode 542a. In this case, the first terminal electrode 551 and the second terminal electrode 552 may be disposed to be spaced apart from each other on a surface to which the first current collecting electrode 541a and the second current collecting electrode 542a are drawn out.

According to an exemplary embodiment of the present disclosure, the first current collecting electrode 541a and the second current collecting electrode 542a of the all solid state battery 500 may be drawn out to the opposite surfaces of the battery body 510 in the third direction (Z direction), respectively.

According to another exemplary embodiment of the present disclosure, each of the first current collecting electrode 541a and the second current collecting electrode 542a of the all solid state battery 500 according to the present disclosure may be drawn out to both surfaces of the battery body 510 in the third direction (Z direction).

In the above-described exemplary embodiment, the all solid state battery 500 according to the present disclosure may have a length in the first direction (X direction) larger than a width in the second direction (Y direction). In the structure in the above-described exemplary embodiment, while the length of the all solid state battery 500 in the first direction (X direction) is larger than the width of the all solid state battery 500 in the second direction (Y direction), the electrodes connected to the outside may be disposed at both end portions of the all solid state battery 500 in the first direction (X direction). In this case, the capacity can be maximized while improving the moisture resistance.

In another exemplary embodiment of the present disclosure, an all solid state battery 600 according to the present disclosure may have a length in the first direction (X direction) smaller than a width in the second direction (Y direction). While the all solid state battery 600 in the present exemplary embodiment has a structure in which the length thereof in the first direction (X direction) is smaller than the width thereof in the second direction (Y direction), a first connection portion 641 may include a first protection portion 641b disposed in contact with a first current collecting electrode 641a, and a second connection portion 642 may include a second protection portion 642b disposed in contact with a second current collecting electrode 642a. In this structure, a distance between the electrodes connected to the outside is relatively short to implement a chip having a low ESL with a high reliability in moisture resistance.

In an exemplary embodiment, the all solid state battery according to the present disclosure may further include a cathode active material disposed at an end portion of the cathode in a direction toward the second connection portion and/or an anode active material disposed at an end portion of the anode in a direction toward the first connection portion. That is, in this case, the cathode active material may be disposed on a head surface of the cathode current collector so that the surface of the cathode current collector is disposed in contact with the cathode active material. Also, the anode active material may be disposed on a head surface of the anode current collector, so that the surface of the anode current collector is disposed in contact with the anode active material.

In another exemplary embodiment, the all solid state battery according to the present disclosure may further include an insulating member disposed at the end portion of the cathode in the direction toward the second connection portion and/or at the end portion of the anode in the direction toward the first connection portion. The end portion of the cathode in the direction toward the second connection portion and/or the end portion of the anode in the direction toward the first connection portion, which is a so-called "margin in the first direction", may refer to a space for preventing the cathode and the anode from being short-circuited. When the insulating member is included in the space, a defect such as a short circuit can be prevented. The insulating member may include a ceramic ingredient. For example, the ceramic ingredient of the insulating member may be identical to that of the above-described margin portions.

As set forth above, according to the exemplary embodiment of the present disclosure, it is possible to provide an all solid state battery having a high reliability in moisture resistance.

Further, it is possible to provide an all solid state battery capable of simplifying a production process to increase process efficiency.

In addition, it is possible to provide an all solid state battery capable of producing a small-size product.

While exemplary embodiments have been shown and described above, it will be apparent to those skilled in the art that modifications and variations could be made without departing from the scope of the present invention as defined by the appended claims.

What is claimed is:

1. An all solid state battery comprising:
a battery body including an electrode assembly having first and second surfaces opposing each other in a first direction, third and fourth surfaces opposing each other in a second direction, and fifth and sixth surfaces opposing each other in a third direction, and including a solid electrolyte layer and a cathode and an anode stacked in the third direction with the solid electrolyte layer interposed therebetween, a first margin portion disposed on the third surface of the electrode assembly, and a second margin portion disposed on the fourth surface of the electrode assembly;
a first connection portion disposed on the first surface of the electrode assembly; and
a second connection portion disposed on the second surface of the electrode assembly,
wherein the first connection portion includes a first current collecting electrode connected to the cathode and a first protection portion disposed on the first current collecting electrode,
the second connection portion includes a second current collecting electrode connected to the anode and a second protection portion disposed on the second current collecting electrode,
the first current collecting electrode is drawn out along the third direction to be exposed by a first outer surface of the first connection portion such that at least a portion of an exposed surface of the first current collecting electrode is spaced apart from the first protection portion, the first outer surface being one of two outer surfaces of the first connection portion opposing each other in the third direction, and
the second current collecting electrode is drawn out along the third direction to be exposed by a second outer surface of the second connection portion such that at least a portion of an exposed surface of the second current collecting electrode is spaced apart from the second protection portion, the second outer surface being one of two outer surfaces of the second connection portion opposing each other in the third direction.

2. The all solid state battery of claim 1, wherein the first protection portion at least partially covers the first current collecting electrode, and
the second protection portion at least partially covers the second current collecting electrode.

3. The all solid state battery of claim 1, wherein the first protection portion entirely covers one surface of the first current collecting electrode in the first direction, and
the second protection portion entirely covers one surface of the second current collecting electrode in the first direction.

4. The all solid state battery of claim 1, wherein a maximum value of a width of the first current collecting electrode and/or the second current collecting electrode in the second direction is smaller than that of the battery body.

5. The all solid state battery of claim 1, wherein a maximum value of a height of the first current collecting electrode and/or the second current collecting electrode in the third direction is smaller than that of the battery body.

6. The all solid state battery of claim 1, wherein the cathode includes a cathode current collector and a cathode active material, and
the anode includes an anode current collector and an anode active material.

7. The all solid state battery of claim 1, further comprising a first terminal electrode connected to the first current collecting electrode and a second terminal electrode connected to the second current collecting electrode,
wherein the first terminal electrode and the second terminal electrode are disposed to be spaced apart from each other on a surface of the battery body to which the first current collecting electrode and the second current collecting electrode are drawn out.

8. The all solid state battery of claim 1, wherein the first current collecting electrode and the second current collecting electrode are drawn out to opposite surfaces of the battery body in the third direction, respectively.

9. The all solid state battery of claim 1, wherein each of the first current collecting electrode and the second current collecting electrode is drawn out to both surfaces of the battery body in the third direction.

10. The all solid state battery of claim 9, wherein a maximum value of a height of each of the first current collecting electrode and the second current collecting electrode in the third direction is equal to that of the battery body.

11. The all solid state battery of claim 1, wherein each of the first current collecting electrode and the second current collecting electrode is drawn out to both surfaces of the battery body in the third direction and to both surfaces of the battery body in the second direction.

12. The all solid state battery of claim 11, wherein a maximum value of a width of each of the first current collecting electrode and the second current collecting electrode in the second direction is smaller than that of the battery body, and
a maximum value of a height of each of the first current collecting electrode and the second current collecting electrode in the third direction is equal to that of the battery body.

13. The all solid state battery of claim 1, wherein the all solid state battery has a length in the first direction larger than a width in the second direction.

14. The all solid state battery of claim 1, wherein the all solid state battery has a length in the first direction smaller than a width in the second direction.

15. The all solid state battery of claim 1, wherein the first current collecting electrode and the second current collecting electrode are drawn out to only one of both surfaces of the battery body in the third direction.

16. The all solid state battery of claim 15, wherein the first current collecting electrode and the second current collecting electrode are drawn out to one of both surfaces of the battery body in the third direction.

17. The all solid state battery of claim 1, wherein the cathode includes a cathode current collector and a cathode active material,
the anode includes an anode current collector and an anode active material, and
an average length of the solid electrolyte layer is larger than that of the cathode active material, the anode active material, the cathode current collector, and/or the anode current collector.

18. The all solid state battery of claim 1, further comprising a solid electrolyte layer disposed at an end portion of the cathode in a direction toward the second connection portion and/or at an end portion of the anode in a direction toward the first connection portion.

19. The all solid state battery of claim 1, further comprising an insulating member disposed at an end portion of the cathode in a direction toward the second connection portion and/or at an end portion of the anode in a direction toward the first connection portion.

20. The all solid state battery of claim 1, wherein the first protection portion is disposed on the first surface of the electrode assembly and the second protection portion is disposed on the second surface of the electrode assembly.

21. The all solid state battery of claim 20, wherein among the first surface, the second surface, the fifth surface, and the sixth surface of the electrode assembly, the first protection portion is disposed only on the first surface and the second protection portion is disposed only on the second surface.

* * * * *